United States Patent [19]

Otten et al.

[11] Patent Number: 4,726,909

[45] Date of Patent: Feb. 23, 1988

[54] LOW ODOR SURFACTANT

[75] Inventors: Jay G. Otten, Flat Rock; Edward J. Parker, Riverview, both of Mich.

[73] Assignee: BASF Corporation, Parsippany, N.J.

[21] Appl. No.: 812,335

[22] Filed: Dec. 23, 1985

[51] Int. Cl.$^4$ ............................................. C11D 1/722
[52] U.S. Cl. ................................ 252/174.21; 252/135; 252/174.22; 252/187.21; 252/187.23; 252/187.33; 252/DIG. 1; 528/408; 564/505; 568/622
[58] Field of Search ...................... 252/174.21, 174.22, 252/DIG. 1; 528/408; 568/622, 623, 624, 625; 564/505

[56] References Cited

U.S. PATENT DOCUMENTS

| | | | |
|---|---|---|---|
| 2,674,619 | 4/1954 | Lundsted | 260/485 |
| 2,677,700 | 5/1954 | Jackson et al. | 260/488 |
| 2,979,528 | 4/1961 | Lundsted | 260/584 |
| 3,036,118 | 5/1962 | Jackson et al. | 260/484 |
| 3,117,999 | 1/1964 | Boettner et al. | 564/505 |
| 3,118,000 | 1/1964 | Dupre et al. | 564/505 |
| 3,314,891 | 4/1967 | Schmolka et al. | 252/89 |
| 3,802,905 | 4/1974 | Beyer et al. | 568/624 |
| 3,956,401 | 5/1976 | Scardera et al. | 568/625 |
| 4,207,421 | 6/1980 | Scardera et al. | 568/625 |
| 4,244,832 | 1/1981 | Kaneko | 252/174.21 |
| 4,256,601 | 3/1981 | Sobata et al. | 252/174.22 |
| 4,272,394 | 6/1981 | Kaneko | 252/174.21 |
| 4,306,987 | 12/1981 | Kaneko | 252/99 |
| 4,411,810 | 10/1983 | Dutton et al. | 252/99 |

FOREIGN PATENT DOCUMENTS

| | | |
|---|---|---|
| 9258 | 2/1964 | Japan . |
| 47497 | 4/1981 | Japan . |
| 166600 | 9/1984 | Japan . |
| 955482 | 4/1964 | United Kingdom . |

OTHER PUBLICATIONS

Propylene Oxide and Higher 1,2 Epoxide Polymers, Encyclopedia of Polymer Science and Engineering, vol. 6, pp. 273-284, John Wiley and Sons, Inc., 1986.

Polyethers, Charles C. Price, Dept. of Chemistry, University of Pennsylvania, Philadelphia, Pennsylvania 19104, Mar. 26, 1974.

Methods of Gas Dispersion, Perry's Chemical Engineer's Handbook, Sixth Edition, pp. 18-61 and 18-62, McGraw-Hill Book Company.

*Primary Examiner*—Paul Lieberman
*Assistant Examiner*—Hoa V. Le
*Attorney, Agent, or Firm*—Bill C. Panagos; Bernhard R. Swick

[57] ABSTRACT

Relates to deodorizing a polyoxypropylene group terminated polyoxyalkylene polyether polyol composition by removing allyloxypropan-2-ol in sufficient amount to reduce the content to less than 200 ppm.

26 Claims, No Drawings

LOW ODOR SURFACTANT

BACKGROUND OF THE INVENTION

This invention relates to low odor surfactants and process for preparing same.

In the art of cleaning compositions for use in cleaning hard surfaces, particularly the art of cleaning tableware and other food-soiled utensils in machine dishwashers, the problem of excess foam buildup in the machine during operation as the result of high food soil concentrations was present. Also the machine dishwashing compositions had the tendency to foam excessively and/or leave undesirable spots and streaks on dishes and glassware. The conventional low foaming nonionic surfactants contained in such detergent compositions were ineffective in most cases in both removing food soil and providng suitable foam control where the aqueous cleaning solution became contaminated with foam generating protein soils such as egg soil and soil from various milk products.

The generation of such foams is particularly insidious in that the cleaning action of the machine dishwasher depends to a large extent upon the effective suppression of foam generation during operation. Without effective foam suppression, the mechanical cleaning action of the machine dishwasher is reduced as the result of foam buildup in the aqueous cleaning solution so that the aqueous washing fluid which is normally impelled against the tableware in the machine dishwasher is less effective in cleaning because it is forced against the tableware at reduced pressure. These problems have been largely solved by the use of alkyl phosphate ester defoamers such as monostearyl acid phosphate as disclosed in U.S. Pat. No. 3,314,891. While the use of monostearyl acid phosphate is effective for defoaming dishwasher compositions incorporating it, it presents problems when relatively low temperature water is employed, i.e., about 100° F. or less.

A series of nonionic surfactants, certain members of which possess a relatively low cloud point as measured in a 1 percent aqueous solution, are available. Such surfactants are suggested for use in the formulation of machine dishwashing detergents and generally for use where a defoamer is necessary and where it is desired to employ a washwater temperature of about 100° F. or less. These compounds are prepared using an active hydrogen terminated initiator which is prepared in much the same way as the polymers of U.S. Pat. No. 3,036,118 by first oxyethylating the initiator compound and subsequently oxypropylating the resulting compound to produce the nonionic surface active agent as more completely described in U.S. Pat. No. 3,036,118 incorporated herein by reference. U.S. Pat. Nos. 4,244,832; 4,272,394; and 4,306,987 provide a disclosure of dishwashing detergents containing such nonionic surfactants. The latter two patents disclose the use of low foaming nonionic surfactants of five different generalized formulas, all of which are terminated by chains of oxypropylene groups or groups with greater than three carbon atoms. While such dishwashing detergent compositiona may be used at washwater temperatures below 100° F. and even as low as 80° F. and are low foaming they present a problem not presented by the preferred composition of U.S. Pat. No. 3,314,891. The preferred compositions of this latter patent rather than being terminated with oxypropylene groups or oxyalkylene groups having more than three carbon atoms, are terminated with oxyethylene rich groups. The oxypropylene group terminated compounds have the disadvantage in that the commercially produced products generally have what might be considered a typical polyoxypropylene odor due to the presence of various impurities such as allyl alcohol, substituted dioxolanes and allyloxypropan-2-ol which are by-products of the oxypropylation reactions. The preferred compounds of U.S. Pat. No. 3,314,891 do not present this problem because the polyoxyalkylene surfactants employed in the preferred composition are oxyethylene terminated compounds.

Many impurities that are formed in preparing such oxyalkylene compounds are further reacted with ethylene oxide and thus are eliminated or substantially reduced in the oxyethylene terminated compounds. However, the oxypropylene terminated compounds, on the other hand, do not do this and as a result there is a buildup of these impurities. Accordingly, it is a purpose of the instant invention to eliminate or substantially reduce odor problems in low foaming dishwashing detergent compositions which employ polyoxyalkylene polyols which are terminated with oxypropylene groups. Similar odor problems may also be presented by rinse aid compositions used in dishwashing detergents which employ such oxypropylene group terminated polyoxyalkylene polyethers.

SUMMARY OF THE INVENTION

In accordance with the instant invention, applicants have discovered that while oxypropylene group terminated polyols contain several impurities including allyl alcohol, substituted dioxolanes, and allyloxypropan-2-ol, the amount of the latter present in the polyol is a measure of the strength of the undesirable odor present in the commercially produced product. More specifically, it has been discovered in accordance with the invention, that if the allyloxypropan-2-ol content of an oxypropylene group terminated polyether polyol is reduced down to a maximum of 200 parts per million, the undesirable odors are eliminated or substantially reduced. In accordance with a preferred method of this invention, this is achieved by evacuating the stripping vessel to a very low level, for example, about 1.0 to 10 millimeters of mercury and then raising the pressure to about 2.0 to 70 millimeters of mercury by injecting nitrogen below the surface of the liquid polyol in the treatment vessel.

The novel product produced by this process is a polyoxyalkylene polyether polyol terminated with oxypropylene groups containing less than about 200 parts per million allyloxypropan-2-ol.

DESCRIPTION OF THE PREFERRED EMBODIMENTS

The stripping process may be performed by adding the polyether polyol to a conventional closed container or vessel to which a vacuum is applied by conventional means. Preferred means include mechanical vacuum pumps and steam jet ejectors. In a preferred process, the vacuum device is turned on and the vessel evacuated to the maximum capabilities of the vacuum apparatus, usually about 1.0 to 10 mm of mercury. The pressure (absolute) is then adjusted by adding nitrogen below the surface of the liquid polyol in sufficient amount to increase said pressure to 2.0 to 70 millimeters of mercury. Preferably the temperature is from about 120° to 165° C.

The nitrogen may be added by simply using a dip tube or open end standpipe extending below the surface of the liquid. Alternatively it could be added through the outlet conduit from the vessel. A more preferred method of adding it would be through the use of a sparger such as described on pages 18-61 and 18-62 of Perry's *Chemical Engineers' Handbook*, Sixth Edition, McGraw-Hill, incorporated herein by reference. Such sparger may be simply a short length of pipe, generally of a larger diameter than the conduit for the nitrogen, which has holes drilled through the periphery thereof. It may also take the form of a venturi tube on the end of the pipe which is surrounded by a larger pipe. It may also take the form of a ring or pipe forming a circle or loop around the lower portion of the vessel and having holes drilled therein. As used herein, the term "sparger" means a device such as a length of pipe or a loop or plate having perforations tharein or a nozzle type device. The odor causing impurities may also be removed by other means such as a thin film, falling film, or wiped film evaporator.

The method of this invention is applicable to any polyoxyalkylene polyether polyol which is terminated with oxypropylene groups. Generally the terminal atom on the chains of such compounds is a hydrogen atom which is preceded by the chain of polyoxypropylene groups. However, for simplicity sake, and as generally used in the art, the expression "terminated with oxypropylene groups", as used throughout the instant specification and claims, includes compounds having terminal hydrogen atoms. A preferred type of oxypropylene group terminated polyoxyalkylene polyethers is a cogeneric mixture of conjugated polyoxyalkylene compounds containing in their structure, oxypropylene groups, oxyethylene groups, and the residue of an active hydrogen containing compound. The term "cogeneric mixture" used herein is a term that has been coined to designate a series of closely related homologues that are obtained by condensing a plurality of alkylene oxide units with a reactive hydrogen compound (see U.S. Pat. No. 2,549,438, particularly the sections beginning at column 12, line 40). This expression is well known to those skilled in the art as can be seen from U.S. Pat. Nos. 2,677,700; 2,674,619; and 2,979,528.

The active hydrogen containing compound also referred to herein as an initiator has about 1 to 18 carbon atoms, preferably about 2 to 10 carbon atoms, and at least 1, preferably about 2 to 6, active hydrogen atoms. Such initiators include ethylene glycol, propylene glycol, butylene glycol, hexyl alcohol, octyl alcohol, decyl alcohol, stearyl alcohol, ethylenediamine, triethylenediamine, hexylmethylene diamine, trimethylol propane, pentaerythritol, and erythritol. These compounds may be heteric or block, as long as they are terminated with oxypropylene groups, and are characterized in that the oxyalkylene groups are attached to the initiator compound at the site of the reactive hydrogen atoms.

In one preferred embodiment of this invention, the oxyalkylene compounds are those of the type disclosed in U.S. Pat. No. 3,036,118 prepared by first oxyethylating an initiator compound and subsequently oxypropylating the resulting compound as more completely described in said patent, incorporated herein by reference. In such compounds the polyoxyethylene groups are present in polyoxyethylene chains that are attached to the initiator nucleus at the site of the reactive hydrogen atoms thereby constituting a polyoxyethylene polymer. The oxypropylene groups are attached to the polyoxyethylene polymer in oxypropylene chains. The oxypropylene chains optionally but advantageously contains small amounts of ethylene oxide and the oxyethylene chains optionally but advantageously contain small amounts of other alkylene oxides such as propylene oxide and butylene oxide. Such compounds are believed to correspond to the formula $$Y[(C_2H_4O)_m(C_3H_6O)_n]_xH \qquad I$$

wherein Y is the residue of an organic compound having from about 1 to 18, preferably about 2 to 10 carbon atoms and containing x reactive hydrogen atoms in which x has a value of at least one, preferably about 2 to 6, n has a value such that the molecular weight of the polyoxypropylene hydrophobic base is about 700 to 10,000 and m has a value such that the oxyethylene content of the molecule is from about 10 to 40, preferably about 10 to 30 weight percent.

It is further to be noted that when molecular weight is stated in this specification and claims, unless otherwise noted, there is meant the average theoretical molecular weight which equals the total of the grams of the alkylene oxide employed per mole of reactive hydrogen compound. It is well recognized in the field of alkylene oxide chemistry that the polyoxyalkylene compositions one obtains by condensing an alkylene oxide with a reactive hydrogen compound are actually mixtures of compounds rather than a single molecular compound. The mixture contains closely related homologues wherein the statistical average number of oxyalkylene groups equals the number of moles of the alkylene oxide employed and the individual members in the mixtures contain varying numbers of oxyalkylene groups. Accordingly, as already noted, the oxypropylene chains optionally but advantageously contains small amounts of ethylene oxide and the oxyethylene chains optionally but advantageously contain small amounts of alkylene oxides such as propylene oxide and butylene oxide. Thus the compositions of this invention are mixtures of compounds which are defined by molecular weight of the polyoxypropylene chains and weight percent of oxyethylene groups.

Preferred compounds of the type of formula I are those where Y is a residue of ethylene glycol whereby the formula then becomes $$HO(C_3H_6O)_n(C_2H_4O)_m(C_3H_6O)_nH \qquad II$$

wherein n has a value such that the molecular weight of the polyoxypropylene hydrophobic base is about 700 to 3500, preferably about 700 to 2500, and m has a value such that the oxyethylene content of the molecule is from about 10 to 40, preferably about 10 to 30 weight percent.

Within the broad disclosure of U.S. Pat. No. 3,036,118 nitrogen-containing polyoxyalkylene compositions are included which are similar to those described in U.S. Pat. No. 2,979,528, incorporated herein by reference, with the exception that the positions of the oxyethylene and oxypropylene chains are reversed. These compositions are prepared in much the same way as those disclosed in accordance with the procedure disclosed in U.S. Pat. No. 3,036,118. However, instead of ethylene glycol as an initiator, a reactive hydrogen compound containing nitrogen is utilized. Initiators for these compounds include ammonia, primary amines, alkylene polyamines, alkanol amines, hetrocyclic nitrogen compounds and compounds such as alkylene polyamines. Aliphatic primary diamines, having not over 6 carbon atoms are the preferred nitrogen-containing reactive hydrogen compounds and include ethylene diamine, diethylene triamine, triethylene tetramine, tetraethylene pentamine, hexamethylene diamine, phenylene diamine and the like.

Useful nitrogen-containing nonionic surfactants are mixtures of conjugated polyoxyethylene polyoxypropylene compounds based on a nitrogen-containing reactive hydrogen compound wherein chains of oxyethylene groups having a defined molecular weight are attached to the nucleus of the reactive hydrogen compound at the sites of the hydrogen atoms and wherein the chains of oxypropylene groups are attached to opposite end of the oxyethylene chains. The compositions are prepared by condensing ethylene oxide with a nitrogen-containing reactive hydrogen compound, preferably ethylenediamine and subsequently condensing propylene oxide with the ethylene oxide-reactive hydrogen compound. The collective molecular weight of the oxypropylene chains attached to the nitrogen-containing reactive hydrogen compound must be at least about 700 and can range up to about 7000 or higher. Where ethylenediamine is the reactive hydrogen compound, these compounds are believed to have the following formula:

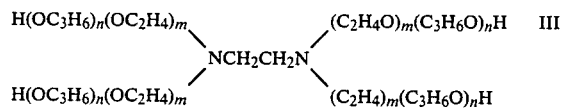

wherein n has a value such that the molecular weight of the polyoxypropylene hydrophobic base is about 700 to 7000, preferably about 700 to 5000, and m has a value such that the oxyethylene content of the molecule is from about 10 to 40, preferably about 10 to 30 weight percent.

Other preferred polyols or polyether surfactants are those wherein Y in formula I above is trimethylolpropane or a blend of octanol and decanol.

The instant invention is also applicable to conventional oxyethylene group terminated polyoxyalkylene polyols capped with oxypropylene groups. More specifically, polymers prepared by reacting all the hydroxyl groups of the oxyethylene group terminated polyols with propylene oxide. For example, the polyols to be capped could be polyoxyalkylene polyether polyols similar to those described above but having oxyethylene terminal groups such as those disclosed, including preparation thereof, in U.S. Pat. Nos. 2,674,619, 2,979,528, and 2,677,700 which are oxyethylene group terminated. When such compounds are capped with oxypropylene groups by conventional methods, a product may be produced which also presents an odor problem, the odor of which may be reduced by removing allyloxypropan-2-ol down to a level below 200 ppm. Also, heteric polyoxyalkylene polyols such as polyols incorporating a heteric mixture of oxypropylene and oxyethylene groups when capped with oxypropylene rich groups by methods known to those skilled in the art present the odor problem.

Such polyoxyalkylene polyols capped with oxypropylene groups are believed to have the following generalized formula:

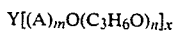

$$Y[(A)_mO(C_3H_6O)_n]_x \qquad IV$$

wherein A is an oxyalkylene group selected from oxyethylene, oxypropylene, oxybutylene, oxytetramethylene, and heteric and block mixtures thereof; m is a whole number selected to give an overall molecular weight of the product of about 700 to 15,000, Y is as set forth above and n represents a value whereby the total number of oxypropylene groups in the compound is about 15 to 200.

In a preferred embodiment x is 1 to 6, A comprises oxypropylene or oxybutylene groups centrally located in the molecule with oxyethylene groups attached at each end thereof. The oxypropylene caps are attached to the ends of the oxyethylene groups opposite the oxypropylene or oxybutylene groups. In another embodiment. A is a heteric mixture of oxypropylene or oxybutylene groups with oxyethylene groups. The preferred compounds prior to capping generally have the formula

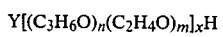

$$Y[(C_3H_6O)_n(C_2H_4O)_m]_xH \qquad V$$

wherein Y is the residue of an organic compound having about 1 to 6 carbon atoms, and containing x reactive hydrogen atoms in which x has a value of 1 to 6. n has a value such that the molecular weight of the polyoxypropylene hydrophobic base is about 700 to 15,000 and m has a value such that the oxyethylene content of the molecule is from about 10 to 40, preferably about 10 to 30 weight percent. As in the above compounds, the oxypropylene chains optionally, but advantageously, contain small amounts of ethylene oxide and the oxyethylene chains optionally but advantageously contain small amounts of alkylene oxides such as propylene oxide and butylene oxide. A preferred compound of this type prior to capping is one wherein Y is propylene glycol whereby the formula is:

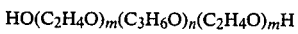

$$HO(C_2H_4O)_m(C_3H_6O)_n(C_2H_4O)_mH \qquad VI$$

wherein m has the value set forth above for formula V and n has a value such that the molecular weight of the polyoxypropylene hydrophobic base is about 700 to 4000. These compounds are more particularly described in U.S. Pat. No. 2,674,619 incorporated herein by reference. In the products which are of the type more particularly described in U.S. Pat. No. 2,979,528, Y represents the reactive hydrogen compounds containing nitrogen and having up to about 6, inclusive, carbon atoms. A preferred compound of this type prior to capping is one wherein Y is ethylenediamine and the formula is:

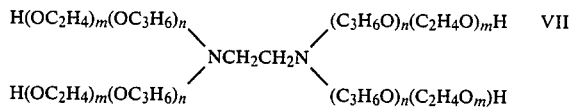

wherein n has a value such that the molecular weight of all the polyoxypropylene hydrophobic groups is about 700 to 8000 and m has a value such that the oxyethylene content of the molecule is from about 10 to 40, preferably about 10 to 30 weight percent.

In another preferred embodiment, Y in formulas IV and V is trimethylolpropane. The polyols of formulas V, VI and VII are then capped with the oxypropylene groups by methods well known to those skilled in the art whereby the total number of oxypropylene groups in the compound is from about 15 to 200.

The deodorized polyoxyalkylene polyol surfactants of this invention are most useful when formulated in cleaning products such as for home dishwashing, wear washing, hard surface cleaning or other uses. It is in such products that the odor presents a serious problem since customers utilizing such products may reject any product with a disagreeable odor.

Useful cleaning compositions incorporating the deodorized polyoxyalkylene polyols of the instant invention generally include additional components which make up the formulated detergent composition.

The manner of using these components by incorporating in a dishwashing, laundry, hard surface cleaner, or other detergent composition is well known to those skilled in the art. Such additional components include other nonionic surfactants, chlorine releasing agents, builders, and additives such as bleaches, abrasives, fillers, dyes, perfumes, soil antiredeposition agents, corrosion inhibitors, silicates, alkalies, processing aids, hydrotropes, etc.

The preferred nonionic surfactants employed as additional components include the oxyethylene group terminated compounds of formulas V, VI, and VII set forth above. Other nonionics that may be employed include the polyoxyethylene condensates of alkylphenols having from about 6 to 20 carbon atoms in the alkyl portion and from about 5 to 30 ethyleneoxy groups in the polyoxyethylene radical, alkylene oxide adducts of higher aliphatic alcohols and thioalcohols having from about 8 to 22 carbon atoms in the aliphatic portion and about 3 to 50 oxyalkylene units in the oxyalkylene portion and which are preferably oxyethylene group terminated. Other well known nonionics may also be employed.

Important components of cleaning compositions particularly automatic dishwashing detergents are the builders or builder salts such as alkaline condensed phosphate salts, for instance, tetrasodium pyrophosphate and those polyphosphates of the calcium and magnesium ion sequestering type whose $Na_2O/P_2O_5$ ratios range from 1:1 to 1.67:1 and 20 to 80 weight percent of an alkaline detergent salt such as sodium carbonate, sodium bicarbonate and mixtures thereof, di- and trisodium orthophosphate, sodium metasilicate, sodium sesquisilicate, borax and sodium borate.

Alternatively to the use of phosphate builders, any of the water-soluble metal salts of citric acid can be used in the practice of the present invention. However, all salts do not serve with equal effectiveness, and the alkali metal salts, particularly the sodium and potassium citrates, are preferred. Suitable proportions of silicates in dishwashing formulations are employed to overcome certain difficulties. The silicate used is preferably solid granular sodium metasilicate, a commercially available material. Sodium silicates in which the mole ratio of $SiO_2:Na_2O$ are more than 1:1, e.g., 2:1 or 3:1, may be used in place of the sodium metasilicate.

The combination of the citrate and condensed phosphate salt (e.g., sodium tripolyphosphate) appears to result in an enhanced activity.

Active chlorine-containing compounds or chlorine-releasing compounds are often desirable in cleaning compositions. Such compounds which may be employed in accordance with the instant invention include chlorinated trisodium phosphate, trichlorocyanuric acid, sodium salt of dichlorocyanuric acid, potassium salt of dichlorocyanuric acid, sodium hypochlorite, potassium hypochlorite, and 1,3-dichloro-5,5-dimethylhydantoin.

Suitable hydrotropes that may be employed include sodium xylene sulfonate, sodium-2-ethyhexyl sulfates, amine alkaryl sulfonates, alkyl napthalene sulfonates, dodecyl benzene sulfonates and sodium dialkyl sulfosuccinate.

The term "additives" as defined herein and used throughout this specification and claims does not include other surfactants, builder salts and chlorine releasing compounds which are referred to separately.

Preferred cleaning compositions employing products of this invention will comprise from about 1 to 5 percent, preferably about 2 to 4 percent polyoxyalkylene polyether polyol terminated with oxypropylene groups containing less than 200 ppm of allyoxypropan-2-ol and about 95 to 99, preferably about 96 to 98 percent of machine dishwashing components selected from the group consisting of other surfactants, builder salts, chlorine releasing agents, additives and mixtures thereof. Suitable cleaning composition may contain from about 1 to 5 percent, preferably about 2 to 4 percent of the deodorized polyoxyalkylene polyether polyol, about 1 to 5 percent, preferably about 1.5 to 3 percent conventional surfactants, about 0.5 to 2.5 percent, preferably about 0.9 to 1.5 percent available chlorine, about 25 to 80 percent, preferably about 35 to 60 percent builder salts, and about 0 to 60 percent, preferably about 5 to 40 percent additives. Since different chlorine releasing compounds have differing percentages of available chlorine, the amount is expressed herein as percent available chlorine.

When used for washing purposes such as in a dishwashing application, such solution may contain about 0.1 to 0.5, and preferably about 0.15 to 0.3 percent of the total detergent composition set forth above, balance water.

The examples which follow illustrate in more detail the practice of the instant invention. Unless otherwise indicated, all temperatures are in degrees centigrade and all parts, percentages, etc., are by weight. The odor tests were conducted by mixing the surfactant being tested with a commercial dishwashing detergent. A typical commercial detergent has the following composition:

| Component | Weight % |
|---|---|
| Surfactant | 4 |
| Sodium tripolyphosphate | 34 |
| Sodium silicate (dry basis)(2.4:1 $SiO_2:Na_2O$) | 12 |
| Sodium carbonate | 20 |
| Sodium sulfate | 17 |
| Potassium dichloroisocyanurate | 2 |
| Water of hydration | 11 |
| | 100 |

EXAMPLE 1

This example demonstrates the relationship of oxypropylene group terminated polyoxyalkylene polyols allyloxypropan-2-ol content and odor with respect to three prior art surfactant compositions. This relationship is shown in Table I below.

In the table surfactant composition #1 is an oxyethylene group terminated polyoxypropylene polyoxyethylene compound of the type described in U.S. Pat. No. 3,101,374 incorporated herein by reference having an average molecular weight of 3900. This is a well known detergent composition compound for use in machine dishwashing compositions. However, machine dishwashing compositions containing this surfactant have exhibited excessive foaming in the presence of egg soil and other proteins which problem was solved by the use of alkyl phosphate ester defoamers such as monostearyl acid phosphate which were added to surfactant #1.

Surfactant composition #2 is exemplary of the latter composition. More specifically, surfactant composition #2 is a mixture of surfactant composition #1 with monostearyl acid phosphate wherein the amount of monostearyl phosphate is about 3 percent of the surfactant-phosphate compound mixture. While this is an excellent dishwashing surfactant composition, it presented problems where low wash water temperatures were employed and accordingly a trimethylolpropane (TMP) initiated polyoxyalkylene polyol surfactant was developed which would prevent or reduce foaming in the presence of egg soil and which was effective at low wash water temperatures. Dishwashing compositions containing such product are disclosed in U.S. Pat. No. 4,411,810. Surfactant composition #3 was developed as a substitute for #2 in dishwashing compositions. This consisted of the combination of the above TMP initiated surfactant with a conventional surfactant.

The conventional surfactant was a block polyol surfactant prepared by condensing ethylene oxide with ethylene glycol, followed by condensing the resulting product with propylene oxide. The molecular weight of the polyoxypropylene groups was about 3000. The percent oxyethylene groups in the final product was about 25 percent. This was blended in a weight ratio of 3:1 with a TMP initiated surfactant to obtain surfactant composition #3. The latter was a block polyol surfactant having a total molecular weight of about 4400 prepared by condensing ethylene oxide with trimethylolpropane and reacting the ultimate product with propylene oxide. The weight ratio of propylene oxide to ethylene oxide was 85 parts propylene oxide to 15 parts ethylene oxide. This TMP initiated polyol is referred to in Table II as surfactant #11. Surfactant composition #3 was effective in machine dishwashing compositions at low temperatures. Also, it helped reduce odor problems caused by admixture with chlorine-releasing agents. However, as can be seen from Table I below, other odor problems were presented. All three products were analyzed for allyl alcohol and allyloxypropan-2-ol (referred to herein as Ap-2-ol). Machine dishwashing detergents made from these surfactants were tested for odor by subjective testing. The results are shown in Table I below.

TABLE I

| Surfactant Composition | Al. Alc., ppm | Ap-2-ol, ppm | Odor |
| --- | --- | --- | --- |
| 1 | 11 | ND | acceptable |
| 2 | 10 | ND | acceptable |
| 3 | 45 | 921 | unacceptable |

Surfactant compositions #1 and #2 are oxyethylene group terminated while composition #3 is oxypropylene group terminated. As can be seen, the oxypropylene group terminated compound had high amounts of allyl alcohol and allyloxypropan-2-ol whereas the oxyethylene group terminated compounds, i.e., compositions #1 and #2, had low allyl alcohol content and no detectable amounts of allyloxypropan2-ol. It will also be noted that composition #3 which contained 921 ppm of the allyloxypropan-2-ol had an unacceptable odor while the other two compositions which had no detectable amounts of this compound had an acceptable odor when formulated into machine dishwashing formulations.

EXAMPLE 2

The fact that oxypropylene terminated polyol surfactants tend to have high quantities of allyloxypropan-2-ol and allyl alcohol whereas oxyethylene group terminated compounds have low amounts is shown clearly in Table II below. More specifically, surfactants 4–7 which are oxyethylene group terminated all have much lower allyloxypropan-2-ol contents than surfactants 8–11 which are closely related, the main difference being that the relative positions of the oxypropylene and the oxyethylene chains are reversed.

TABLE II

| Surfactant | Al. Alc., ppm | Ap-2-ol, ppm |
| --- | --- | --- |
| 4 | <1 | <100 |
| 5 | <1 | 100 |
| 6 | <1 | 100 |
| 7 | <1 | <100 |
| 8 | 7 | 328 |
| 9 | 11 | 414 |
| 10 | 79 | 810 |
| 11 | 43 | 605 |

In the above table, surfactant #4 is a block copolymer which is a polyoxyethylene adduct of a polyoxypropylene glycol having a central polyoxypropylene chain and polyoxyethylene chains on each end thereof. The molecular weight of the polyoxypropylene hydrophobe is about 1750 and the copolymer contains about 10 percent by weight oxyethylene groups.

Surfactant #5 is a block copolymer which is a polyoxyethylene adduct of a polyoxypropylene glycol having a central polyoxypropylene chain and polyoxyethylene chains on each end thereof. The molecular weight of the polyoxypropylene hydrophobe is about 1640 and the copolymer contains about 29 percent by weight oxyethylene groups.

Surfactant #6 is a block copolymer which is a polyoxyethylene adduct of a polyoxypropylene glycol having a central polyoxypropylene chain and polyoxyethylene chains on each end thereof. The molecular weight of the polyoxypropylene hydrophobe is about 1780 and the copolymer contains about 20 percent by weight oxyethylene groups.

Surfactant #7 is a block copolymer which is a polyoxyethylene adduct of a polyoxypropylene glycol having a central polyoxypropylene chain and a polyoxyethylene chain on each end thereof. The molecular weight of the polyoxypropylene hydrophobe is about 2170 and the copolymer contains about 15 percent by weight oxyethylene groups.

Compositions such as surfactants 4–7 are described in U.S. Pat. Nos. 2,677,700 and 2,674,619.

Surfactant #8 is a block copolymer which is a polyoxypropylene adduct of a polyoxyethylene glycol having a central polyoxyethylene chain and polyoxypropylene chains on each end thereof. The molecular weight of the polyoxypropylene hydrophobe is about 1545 and the copolymer contains about 25 percent by weight oxyethylene groups. Surfactant #9 is a block copolymer which is a polyoxypropylene adduct of a polyoxyethylene glycol having a central polyoxyethylene chain and polyoxypropylene chains on each end thereof. The molecular weight of the polyoxypropylene hydrophobe is about 2094 and the copolymer contains about 15 percent by weight oxyethylene groups. Surfactant #10 is a block copolymer which is a polyoxypropylene adduct of a polyoxyethylene glycol having a central polyoxyethylene chain and polyoxypropylene chains on each end thereof. The molecular weight of the polyoxypropylene hydrophobe is about 2045 and the copolymer contains about 25 percent by weight oxyethylene groups.

Surfactant #11 is the trimethylolpropane surfactant described above with respect to surfactant composition #3 for Table I. As can be seen, this composition is also terminated with oxypropylene groups.

The above surfactants are all made using conventional prior art processing conditions. More specifically, the products were stripped at 95° to 110° C. for one to two hours at less than 10 mm mercury pressure.

Surfactants #8–#10 are described in U.S. Pat. No. 3,036,118.

EXAMPLES 3–8

Plant batches of surfactant compositions of Examples 1 and 2 were submitted to conventional stripping conditions as set forth in Table III below and analyzed for allyl alcohol, dioxanes, and allyloxypropan-2-ol and the odor of the dishwashing detergents made from the stripped product noted. These were all plant production batches and the difference between Example 4 and Example 5 is that the products were from different batches. While the batch of Example 4 showed considerably less allyloxypropan-2-ol than that of Example 5, it was still excessive. While the quantity may vary apparently due to uncontrolled conditions in processing, nevertheless it is always too high. As can be seen, the surfactant examples #7 and #8 were the only ones with acceptable odor and, as pointed out above, these are both oxyethylene terminated compounds.

and a dip tube for injection of nitrogen below the surface of the liquid surfactant in the container. The flask was connected to a conventional vacuum pump. The amount of liquid in the container was about 1 to 4 l. Initially, as in Examples 9–12, only the vacuum was applied in the amount shown in Table IV below with no nitrogen injection. In Examples 13–16, nitrogen was injected below the surface through the dip tube in sufficient amount to raise the absolute pressure to 70 mm of mercury. In Example 17 essentially the conditions of Example 11 were repeated. However, with Examples 18 and 19 the nitrogen maintained the absolute pressure at 8 to 10 mm of mercury. As can be seen in Examples 9–12 and 17 where there was no nitrogen injection, the allyloxypropan-2-ol and allyl alcohol contents were high and the odor in formulated detergents was unacceptable, even when stripped for as much as four hours as in Example 12. On the other hand, Examples 13–16 where, through the use of the nitrogen injection, the absolute pressure was maintained at 60 mm of mercury there was no detectable amount of any of the impurities. Odor of formulated detergent compositions was acceptable even in Example 13 where the stripping was carried out for only 0.9 hour. Example 17 being essentially a repeat of Example 11, again the impurities were high and the odor quality was low. In Example 18, the quality was low but Example 19 where it was treated with nitrogen at 8 to 10 mm of mercury for 3.1 hours the best odor results of that particular pair of tests was achieved.

TABLE IV

| Example | Time hours | Initial Vacuum mmHg | Temperature °C. | $N_2$ Injection mm Hg | Allyl Alcohol | Dioxane | Ap-2-ol | Odor |
|---|---|---|---|---|---|---|---|---|
| 9 | 1 | 10 | 120 | none | 30 | ND | 394 | unacceptable |
| 10 | 2 | 10 | 120 | none | 24 | ND | 492 | unacceptable |
| 11 | 3 | 10 | 120 | none | 22 | ND | 557 | unacceptable |
| 12 | 4 | 10 | 120 | none | 17 | ND | 233 | unacceptable |
| 13 | 0.9 | 10 | 120 | 60 | ND | ND | ND | acceptable |
| 14 | 1.9 | 10 | 120 | 60 | ND | ND | ND | acceptable |
| 15 | 2.9 | 10 | 120 | 60 | ND | ND | ND | acceptable |
| 16 | 3.9 | 10 | 120 | 60 | ND | ND | ND | acceptable |
| 17 | 3 | <10 | 120 | none | 10 | ND | 301 | low quality |
| 18 | 0.25 | <10 | 120 | 8–10 | 15 | ND | 474 | low quality |
| 19 | 3.1 | <10 | 120 | 8–10 | ND | ND | 172 | better than 18 |

EXAMPLES 20–34

In each example surfactant composition #3 was treated in the plant in a 10,000-gallon container which was evacuated by steam jet ejectors. Where indicated in Table V below, nitrogen was injected to increase the pressure to the value shown in Table V under the heading "$N_2$ Injection". The nitrogen was injected through

TABLE III

| Example | Surfactant Composition | Time hours | Vacuum mmHg | Temperature °C. | Allyl Alcohol | Dioxane | Ap-2-ol | Odor |
|---|---|---|---|---|---|---|---|---|
| 3 | 11 | 2 | <10 | 93–105 | 43 | ND | 605 | unacceptable |
| 4 | 3 | 2 | <10 | 93–105 | 69 | ND | 388 | unacceptable |
| 5 | 3 | 2 | <10 | 93–105 | 45 | ND | 921 | unacceptable |
| 6 | 10 | 2 | <10 | 93–105 | 79 | 1 | 810 | unacceptable |
| 7 | 2 | 2 | <10 | 93–105 | 10 | 1 | ND | acceptable |
| 8 | 1 | 2 | <10 | 93–105 | 11 | ND | ND | acceptable |

EXAMPLES 9–19

Surfactant composition #3 of Example 5 above was stripped under laboratory conditions in a round bottom flask equipped with an overhead stirrer, thermometer, a drain pipe. The results are shown in Table V below. All examples were analyzed for Ap-2-ol content. However, only those treated for the longest period of time under a given set of conditions were subjected to odor tests.

TABLE V

| Example | Time hours | Initial Vacuum mmHg | Temperature °C. | N₂ Injection to mm Hg | Allyl Alcohol | Dioxane | Ap-2-ol ppm | Odor |
| --- | --- | --- | --- | --- | --- | --- | --- | --- |
| 20 | 2 | <10 | 120 | 10 | 17 | ND | 167 | — |
| 21 | 4 | <10 | 120 | none | 10 | ND | 502 | — |
| 22 | 6 | <10 | 120 | none | 4 | ND | 259 | — |
| 23 | 8 | <10 | 120 | none | ND | ND | 334 | unacceptable |
| 24 | 1.5 | 10 | 127 | 15 | 4 | ND | 268 | — |
| 25 | 4.0 | 10 | 135 | 35 | ND | ND | 150 | — |
| 26 | 7.0 | 10 | 143 | 50 | ND | ND | 92 | — |
| 27 | 8.5 | 10 | 147 | 50 | ND | ND | 46 | acceptable |
| 28 | 0 | — | 147 | — | 16 | — | 287 | — |
| 29 | 0 | — | 147 | — | <1 | — | 301 | — |
| 30 | 2 | <10 | 147 | 50 | ND | — | 117 | — |
| 31 | 4 | <10 | 147 | 50 | ND | — | 52 | — |
| 32 | 6 | <10 | 147 | 50 | ND | — | 19 | — |
| 33 | 8 | <10 | 147 | 50 | ND | — | 7 | acceptable |
| 34 | 8 | <10 | 147 | 50 | ND | — | 8 | acceptable |

EXAMPLE 35

Quantities of surfactant #3 were also subjected to treatment with conventional impurity removing materials at 100° C. for periods of at least two hours and in some cases as much as 24 hours. They were treated at 100° C. which is near the temperature at which the catalyst is removed from polyols in plant production and also a temperature to reduce the polyol viscosity sufficiently to allow efficient contact between the odor bodies and the impurity removing materials. The surfactants were treated with molecular sieve, carbon black, diatomaceous earth, silica gel, alumina, and magnesium oxide. The lowest allyloxypropan-2-ol content after such treatment was 279 pp which is well above the 200 ppm maximum necessary for acceptable odor properties. The allyloxypropan-2-ol contents after such treatment ranged as high as 820 ppm.

The embodiments of the invention in which an exclusive property or privilege is claimed are defined as follows:

1. An oxypropylene group terminated polyoxyalkylene polyether polyol composition made by a base catalyzed process containing less than 200 ppm allyloxypropan-2-ol said composition being substantially free from undesirable odor.

2. The composition of claim 1 wherein said polyoxyalkylene polyether polyol is a cogeneric mixture of conjugated polyoxyalkylene compounds containing in their structure oxyethylene groups, oxypropylene groups, and the nucleus of an active hydrogen-containing organic compound having about 1 to 18 aliphatic carbon atoms and about 1 to 6 hydrogen atoms.

3. The composition of claim 2 wherein the oxyethylene groups are present in polyoxyethylene chains that are attached to the nucleus at the site of the reactive hydrogen atoms and the oxypropylene groups are attached to the oxyethylene groups at the end opposite the end of said oxyethylene groups which are attached to the nucleus.

4. The composition of claim 3 wherein said polyoxyalkylene polyol has molecular weight of the polyoxypropylene hydrophobe of about 700 to 10,000 and the percent oxyethylene groups is from about 10 to 40 percent of the surfactant molecule.

5. The composition of claim 4 wherein said active hydrogen-containing organic compound is trimethylolpropane.

6. The composition of claim 2 wherein said polyoxyalkylene polyols are oxypropylene group capped polyols and the polyoxyalkylene polyol prior to capping is a polyoxypropylene polyoxyethylene block copolymer wherein the oxypropylene groups are present in chains that are attached to the nucleus of the active hydrogen-containing organic compound at the site of the reactive hydrogen atoms, the oxyethylene groups being attached to the polyoxypropylene groups at the end opposite the end of said latter groups which are attached to the nucleus.

7. The composition of claim 6 wherein the molecular weight of the polyoxypropylene hydrophobe of said copolymer prior to capping is from about 700 to 15,000, and the oxyethylene groups of said polyoxyalkylene copolymer prior to capping range from about 10 to 40 percent by weight of said compound prior to capping.

8. The composition of claim 7 wherein said active hydrogen-containing organic compound is trimethylolpropane.

9. A cleaning composition comprising the composition of claim 2 plus conventional machine dishwashing components.

10. The composition of claim 9 wherein the amount of the composition of claim 2 is about 1 to 5 percent and the amount of conventional cleaning components is about 95 to 99 percent.

11. The composition of claim 9 including builders.

12. The composition of claim 9 including chlorine-releasing agents.

13. The cleaning composition of claim 9 including a conventional nonionic surfactant.

14. The cleaning composition of claim 9 including additives.

15. A washing solution comprising about 0.1 to 0.5 percent of the composition of claim 9.

16. The cleaning composition of claim 9 comprising about 1.0 to 5.0 percent of the polyoxyalkylene polyol of claim 2, about 25 to 80 percent builder, about 0.5 to 2.5 percent available chlorine, about 1.0 to 5.0 percent by weight conventional nonionic surfactant, and about 0 to about 60 percent additives.

17. An oxypropylene group terminated polyoxyalkylene polyether polyol composition made by a base catalyzed process containing less than 200 ppm allyloxypropan-2-ol produced by the process comprising removing said allyloxypropan-2-ol, along with other impurities, by subjecting said polyol to a vacuum of about 1.0 to 10 mm of mercury and then adjusting the pressure to 2.0 to 70 mm of mercury by injecting nitrogen below the surface of the liquid polyol said composition being substantially free from undesirable odor.

18. The product of claim 17 produced by said process wherein said nitrogen is injected by means of a conduit extending beneath the surface of the liquid polyol.

19. The product of claim 18 produced by said process wherein said conduit leads to a sparger through which said nitrogen enters into said liquid polyol.

20. The product of claim 19 produced by said process wherein said sparging is through a continuous circular conduit.

21. The product of claim 17 produced by said process wherein said nitrogen is injected through the drain of the treatment vessel.

22. The product of claim 17 produced by said process wherein said polyoxyalkylene polyether polyol is co-generic mixture of conjugated polyoxyalkylene compounds containing in their structure oxyethylene groups, oxypropylene groups, and the nucleus of an active hydrogen-containing organic compound having about 1 to 18 aliphatic carbon atoms and about 1 to 6 hydrogen atoms.

23. The product of claim 17 produced by said process wherein the temperature is from about 120° to 165° C.

24. The product of claim 22 produced by said process wherein the oxyethylene groups are present in polyoxyethylene chains that are attached to the nucleus at the site of the reactive hydrogen atoms and the oxypropylene groups are attached to the oxyethylene groups at the end opposite the end of said oxyethylene groups which are attached to the nucleus.

25. The product of claim 22 produced by said process wherein said polyoxyalkylene polyols are oxypropylene group capped polyols and the polyoxyalkylene polyol prior to capping is a polyoxypropylene polyoxyethylene block copolymer wherein oxypropylene groups are present in chains that are attached to the nucleus of the active hydrogen-containing organic compound at the site of the reactive hydrogen atoms, the oxyethylene groups being attached to the polyoxypropylene groups at the end opposite the end of said latter groups which are attached to the nucleus.

26. The product of claim 22 produced by said process wherein said active hydrogen containing compound is trimethylolpropane.

* * * * *